(12) United States Patent
Sripracha et al.

(10) Patent No.: US 8,548,917 B1
(45) Date of Patent: Oct. 1, 2013

(54) DETECTION OF CHILD FRAMES IN WEB PAGES

(75) Inventors: Ram Sripracha, Seattle, WA (US); Dominique I. Brezinski, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/607,441

(22) Filed: Sep. 7, 2012

(51) Int. Cl.
*G06Q 20/00* (2012.01)
*G06Q 30/00* (2012.01)

(52) U.S. Cl.
USPC .... 705/50; 705/14.26; 705/14.47; 705/14.54; 726/1; 726/11; 726/22; 726/26; 709/217

(58) Field of Classification Search
USPC .............. 705/50, 14.26, 14.47, 14.54; 726/1, 726/11, 22, 26; 709/217
See application file for complete search history.

(56) References Cited

U.S. PATENT DOCUMENTS

| | | | |
|---|---|---|---|
| 7,783,719 B2 * | 8/2010 | Miller | 709/217 |
| 8,321,269 B2 * | 11/2012 | Linden et al. | 705/14.26 |
| 2006/0136294 A1 * | 6/2006 | Linden et al. | 705/14 |
| 2007/0260736 A1 * | 11/2007 | Miller | 709/227 |
| 2010/0281537 A1 * | 11/2010 | Wang et al. | 726/22 |
| 2010/0299205 A1 * | 11/2010 | Erdmann et al. | 705/14.54 |
| 2011/0154473 A1 * | 6/2011 | Anderson et al. | 726/11 |
| 2011/0289546 A1 * | 11/2011 | Pieczul et al. | 726/1 |
| 2011/0321162 A1 * | 12/2011 | Gluck | 726/22 |
| 2011/0321168 A1 * | 12/2011 | Amit et al. | 726/26 |

FOREIGN PATENT DOCUMENTS

WO    WO2009/133386 A1 * 11/2009

OTHER PUBLICATIONS

Bhola et al. ("Security for Web2.0 application scenarios: Exposures, Issues and Challenges", IBM T.J. Watson Research Center, Apr. 30, 2007, 2 pages).*
Lori MacVittie, "Clickjacking Protection Using X-Frame-Options Available for Firefox," DevCentral, Published Jun. 23, 2009. Source: http://devcentral.f5.com/blogs/us/clickjacking-protection-using-x-frame-options-available-for-firefox , pp. 1-6.
Eric Law, "Combating ClickJacking With X-Frame-Options," Microsoft Developer Network, Mar. 30, 2010. Source: http://blogs.msdn.com/b/ieinternals/archive/2010/03/30/combating-clickjacking-with-x-frame-options.aspx pp. 1-3.

* cited by examiner

*Primary Examiner* — James D Nigh
(74) *Attorney, Agent, or Firm* — Robert C. Kowert; Meyertons, Hood, Kivlin, Kowert & Goetzel, P.C.

(57) ABSTRACT

Methods and systems for framing detection are disclosed. A web page comprising a child frame is generated. The child frame comprises an instruction to load a component from a merchant. The child frame comprises a header option restricting a loading of the component from within a parent frame associated with a domain external to the merchant. The web page is sent from the merchant to a client browser. It is determined that the web page is loaded within the parent frame in the client browser if a request for the component is not received by the merchant. It is determined that the web page is not loaded within the parent frame in the client browser if a request for the component is received by the merchant.

25 Claims, 6 Drawing Sheets

DETECTION OF CHILD FRAMES IN WEB PAGES

BACKGROUND

In the burgeoning field of internet commerce, affiliate programs are a popular way for online merchants to expand visibility and increase sales. An affiliate program may reward a third party (referred to as the affiliate) for directing a customer to a merchant, usually with a percentage of the sale or other small fee upon completion of a qualifying transaction. In the case of an online merchant, the affiliate may direct potential customers to the merchant by providing a web link to the merchant, referred to herein as a referral link. The referral link may direct potential customers to the home page of the merchant or to a particular product page. In order to properly compensate the affiliates, the merchant may track the referrals. For example, the referral link may include a unique identifier of the affiliate. After a user has clicked on a referral link, the merchant website may store or update a cookie in the memory of the user's browser such that the cookie includes the unique identifier of the referring affiliate. When a transaction with the user is completed, the online merchant may then refer to the contents of the cookie to determine the identity of the affiliate to be compensated for the referral.

However, affiliate programs may be susceptible to various types of fraud. For example, in the fraudulent practice known as "cookie stuffing," an affiliate may cause a user's browser to visit an online merchant without the user's knowledge. The affiliate may cause the merchant's website to be loaded in the user's browser in a manner that is difficult for the user to detect, such as by loading the merchant's website in a very small frame in a web page provided by the affiliate. Even though the user may be unaware of the visit to the merchant, the user's cookie may be updated by the merchant to include the identifier of the affiliate. If the user completes a transaction with the merchant at a later point in time, the affiliate may be improperly compensated for the illegitimate referral. In a similar type of fraud known as "history stuffing," an affiliate may cause a user's browser to visit a particular product page at on online merchant without the user's knowledge. If the history stuffing is not detected by the merchant, the improperly visited product page may be advertised to the user as a previously visited page. In yet another fraudulent practice known as "clickjacking," clicks (e.g., button selections) or keystrokes may be hijacked through the use of multiple layers to disguise the identity of the user interface element being used to capture user input. As a result of the clickjacking, any number of undesirable actions or transactions may be performed without the user's knowledge or consent. For example, the user's browser may be redirected to another page without the user's consent, the user's confidential data may be captured by a third party without the user's knowledge, or the user may otherwise be deceived into taking an action.

Some prior approaches have used a client-side scripting language such as JavaScript to detect fraudulent practices such as cookie stuffing and history stuffing. In some cases, for example, a script running in the client browser may detect the use of child frames to load a merchant's web page. However, some browsers are configured to disable JavaScript. If the client-side scripting environment is disabled, then the merchant may be vulnerable to the various types of fraud discussed above.

Accordingly, it is desirable for online merchants to have techniques for detecting illegitimate or fraudulent affiliate referrals as well as other fraudulent activity.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for detection of child frames in web pages are described. Using the systems and methods described herein, the use of frames (e.g., inline frames or iframes) to load a web page may be detected without the use of a client-side scripting solution such as JavaScript. In this manner, fraudulent practices such as "cookie stuffing," "history stuffing," and "clickjacking" may be detected, and the effects of such practices may be mitigated.

Figure 1:
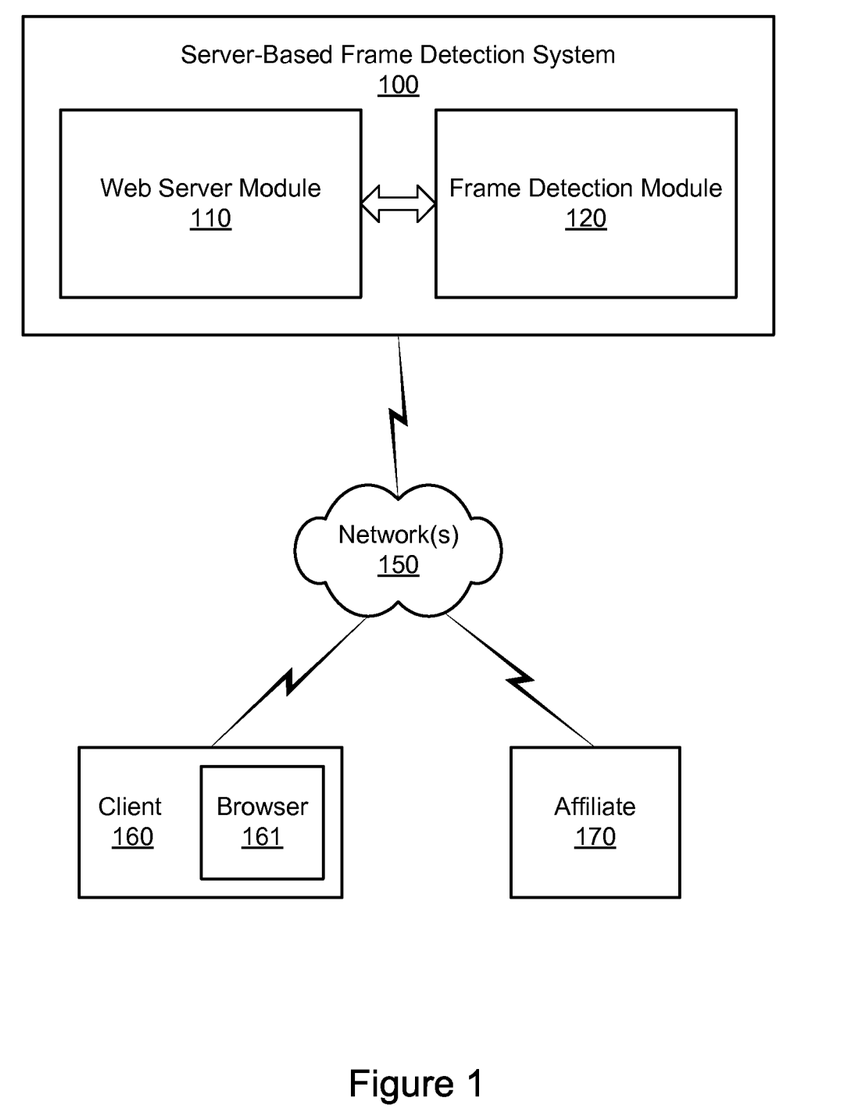
FIG. 1 illustrates an example system environment for detection of child frames in web pages, according to one embodiment.

FIG. 1 illustrates an example system environment for detection of child frames in web pages, according to one embodiment. The example system environment may comprise a server-based frame detection system 100. The server-based frame detection system may include various modules such as a web server module 110 and a frame detection module 120. The server-based frame detection system 100 may comprise one or more computing devices, any of which may be implemented by the example computing device 3000 illustrated in FIG. 6. In various embodiments, the functionality of the different modules (e.g., frame detection module 120 and web server module 110) may be provided by the same computing device or by different computing devices. If the frame detection module 120 and web server 110 module are implemented using different computing devices, then the modules may be communicatively coupled, e.g., via a network.

In one embodiment, the server-based frame detection system 100 and its constituent modules may be managed by an online merchant. A client computer system 160 may communicate with the server-based frame detection system 100 over one or more networks 150 (e.g., the internet). Using the web server module 110, web pages and their components (e.g., images, video, audio, scripts, etc.) may be sent to a client browser 161 upon receiving appropriate requests from the browser. The browser 161 may comprise any suitable set of program instructions executable to receive web data and render web pages based on the web data. In one embodiment, the web server 110 may generate elements of a web page dynamically, e.g., upon request from a client browser 161. The web server module 110 may host one or more web servers under a domain such as "amazon.com." Individual ones of the web servers may be hosted at related addresses within the same domain, e.g., "server-1.amazon.com" and "server-2.amazon.com." In one embodiment, different ones of the web servers may be tasked with providing different types of data to client browsers. For example, one set of web servers may provide textual elements of web pages, and another set of web servers may provide images referenced in the web pages.

An affiliate web server 170 may be coupled to the client 160 over the network(s). The affiliate web server 170 may be managed by an affiliate of the online merchant that manages the server-based frame detection system 100. In one embodiment, the affiliate may receive compensation from the online merchant for directing a customer to the online merchant if the customer completes a qualifying transaction. The act of the affiliate directing a customer to the online merchant is known as a referral. In a legitimate referral, the affiliate 170 typically provides a referral link to the online merchant (e.g., to a web page provided by the web server module 110), and the customer may load the web page into the browser 161 by choosing to follow the referral link. However, in some circumstances, the affiliate may attempt to illegitimately or fraudulently gain a referral fee by directing a customer to the online merchant without the customer's knowledge. This practice is often referred to as cookie stuffing, and the use of framing techniques may be a key element in the practice.

Using the frame detection module 120, the use of framing techniques in the client browser 161 may be detected based on information received or not received at the web server module 110 from the browser 161. In one embodiment, the functionality of the frame detection module 120 may be employed when JavaScript and/or any other relevant client-side scripting environment has been disabled in the client browser 161. For example, the server-based frame detection system 100 may typically be configured to collect client-side metrics from the browser 161 using JavaScript-based techniques; if such metrics are not received, then the server-based frame detection system 100 may determine that JavaScript has been disabled in the browser 161. In one embodiment, a <noscript> tag may be used to implement the framing detection techniques described herein, such that the framing detection techniques may be implemented in a client browser 161 only if JavaScript has been disabled. The detection of frames in the client browser is discussed in greater detail below.

Figure 2:
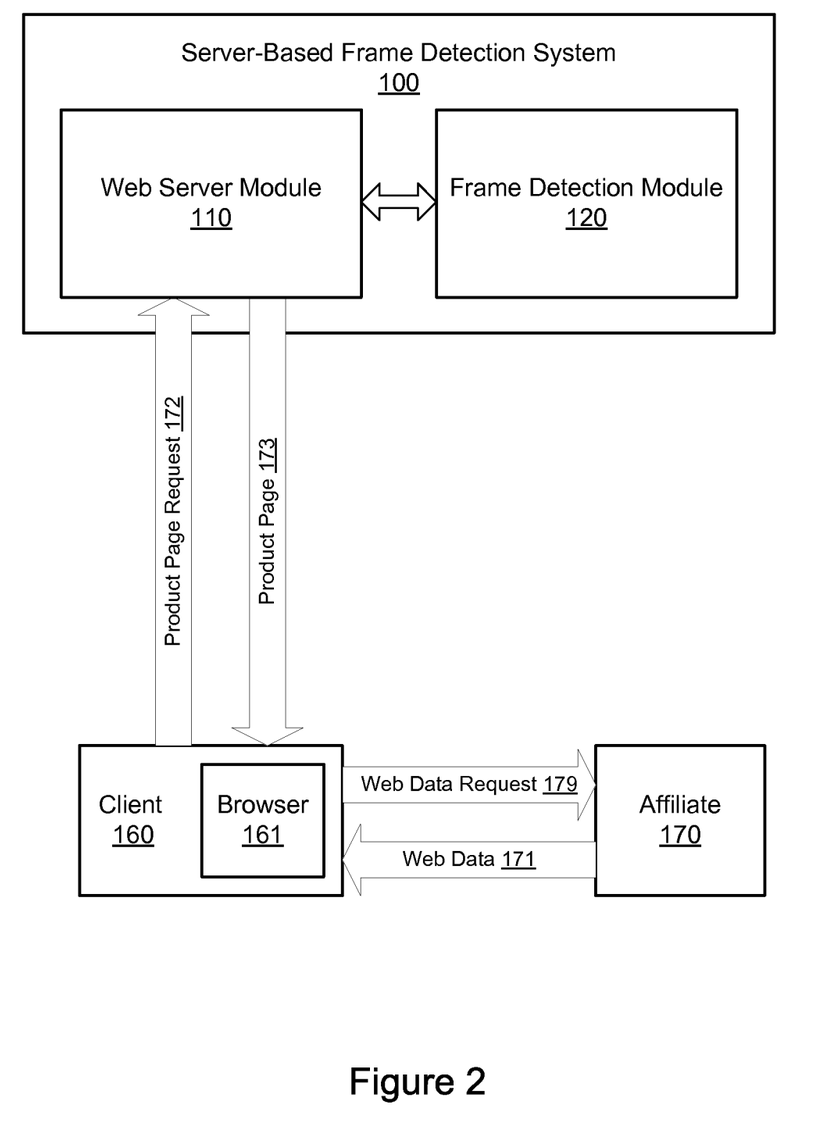
FIG. 2 illustrates further aspects of an example system environment for detection of child frames in web pages according to one embodiment.

FIG. 2 illustrates further aspects of an example system environment for detection of child frames in web pages according to one embodiment. A user may direct the client browser 161 to visit a web page managed by the affiliate 170. Upon receiving an appropriate request 179 for web data from the browser 161, the affiliate web server 170 may send the web data 171 to the browser 161. The browser 161 may render the web data 171 as a web page by interpreting elements of the web data 171 and retrieving any additional elements referenced within the web data 171.

Web pages may be generated in accordance with a markup language such as HTML (HyperText Markup Language). Various types of HTML tags in a web page may be used to denote various types of HTML elements. In generating a display of a web page, the client browser 161 may use the tags to interpret the content of the web page. The HTML elements may include frames. The use of frames in a web page may permit the browser display to be divided into segments. Each of the frames may display a different document or component, and the different documents or components may be sourced from the same web server or from different web servers. One type of frame is an inline frame, also referred to herein as an iframe. The use of an iframe may place another HTML document in a frame inside the body of a normal HTML document. The iframe or its contents may be referred to as a child of the parent document.

In the case of a legitimate referral, the web data 171 may often include an affiliate web page that contains a referral link to the online merchant (e.g., to a domain managed by the web server module 110). The referral link may be a link to the merchant's home page (e.g., http://www.amazon.com) or a link to a particular product page provided by the merchant. If the user chooses to follow a referral link to a product page 173, a product page request 172 may be sent from the client browser 161 to the web server module 110. When, in response to the product page request 172, the product page 173 is sent by the web server module 110 to the client browser 161 and rendered for display in the browser, the affiliate web page generated based on the web data 171 may be replaced in the display of the browser by the product page 173. The referral link may include a unique identifier of the affiliate 170. After a user has clicked on the referral link, the web server module 110 may store or update a cookie in the memory of the client browser 161 such that the cookie includes the unique identifier of the referring affiliate. The product page 173 may offer for sale one or more products or services. When a transaction with the user is completed (e.g., the sale of a product or service offered via the product page 173), the online merchant may then refer to the contents of the cookie to determine the identity of the affiliate to be compensated for the referral.

In the case of an illegitimate referral, the web data 171 may often include an affiliate web page that contains a page from the online merchant (e.g., the merchant's home page or a product page) within a frame. The frame containing the merchant web page may be an inline frame or an iframe. The frame may be loaded in the browser display in a manner that is difficult for the user to detect, such as by loading the merchant's website in a very small frame in the web page provided by the affiliate. When the web data 171 is interpreted and rendered by the browser 161 to generate the affiliate web page, the merchant's site may be visited without the user's knowledge and/or consent. Even though the user is unaware of the visit to the merchant, the user's cookie may be updated by the merchant to include the identifier of the affiliate. If the user completes a transaction with the merchant at a later point in time, the affiliate may be improperly compensated for the illegitimate referral unless measures are taken to detect this practice of cookie stuffing.

Therefore, the web page loaded in an iframe may be a product page or any other page provided by an online merchant. Using the systems and methods described herein for detection of frames, an affiliate referral involving the product page or any other merchant page may be determined to be fraudulent or otherwise illegitimate. In one embodiment, the detection of the iframe usage may be used to detect the practice of cookie stuffing. In one embodiment, the detection of the iframe usage may be used to detect the practice of history stuffing. If cookie stuffing or history stuffing is detected, measures may be taken by the online merchant to mitigate the effects of such practices.

Figure 3A:
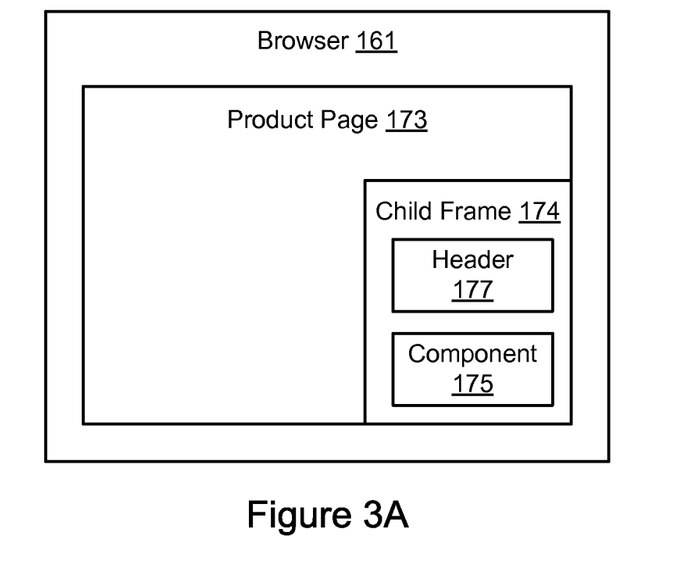
FIG. 3A illustrates a product page with a child frame according to one embodiment.

In one embodiment, the web page for a product or service (i.e., the product page) may generated by the online merchant in a manner that prevents the client browser from loading one or more components of the web page under particular circumstances. To this end, the web page generated by the merchant may include a child frame. FIG. 3A illustrates a product page 173 with a child frame 174 according to one embodiment. The child frame (e.g., an inline frame or iframe) 174 may include a component 175 that may only be loaded in the client browser by obtaining it from the online merchant. In one embodiment, the child frame 174 may be substantially invisible to the user or otherwise difficult for the user to detect. For example, the child frame 174 may be very small in dimension (e.g., one pixel by one pixel). The component 175 in the child frame may comprise an image, such as a one pixel by one pixel image that is invisible or transparent. The image may be hosted at a domain managed by the online merchant (e.g., one or more image servers within the web server module 110). The domain hosting the component 175 in the child frame may be the same domain hosting the product page 173.

In one embodiment, the child frame 174 may also include an HTTP server response header 177 named X-Frame-Options. If the client browser 161 supports the X-Frame-Options header, the header 177 may be used to control the loading of a page in an iframe. In one embodiment, the option DENY may be specified for the X-Frame-Options header to disallow any page from being rendered in an iframe under all circumstances. In one embodiment, the option SAMEORIGIN may be specified for the X-Frame-Options header to allow the iframe to be rendered only if the iframe is within the same domain as the page itself. By specifying the SAMEORIGIN option for a header 177 for the child frame 174, the online merchant may instruct the client browser 161 to render the child frame 174 and load the component 175 (e.g., an invisible image) in the child frame 174 only if the product page 173 is not rendered within an iframe in a page hosted at a different domain. In one embodiment, therefore, the component 175 in the child frame 174 will not be obtained from the online merchant and rendered by the client browser if the product page is located in an iframe in a page hosted by an affiliate 170 (i.e., a page hosted at a domain other than the merchant's domain).

Figure 3B:
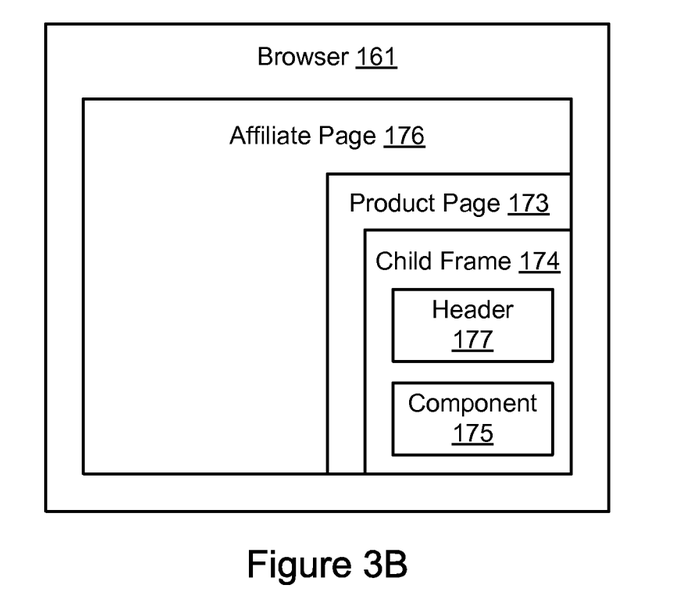
FIG. 3B illustrates an affiliate page with a framed product page according to one embodiment.

FIG. 3B illustrates an affiliate page with a framed product page according to one embodiment. In the case of an illegitimate referral, the affiliate page 176 provided by the affiliate 170 to the browser 161 may include the product page 173 within a frame (e.g., an inline frame or iframe). The frame containing the product page 173 may be very small. By using frames in this manner, the affiliate 170 may make the product page 173 difficult for the user to detect within the affiliate page 176. Using the systems and methods described herein, the framed product page may be provided to the browser 161 such that the product page 173 contains a child frame 174 which further contains a link to a component 175 (e.g., an invisible or transparent image). If the X-Frame-Options header 177 is configured with the SAMEORIGIN option as discussed above, and if the browser 161 supports the X-Frame-Options header, then the component 175 may not be loaded into the affiliate page 176. In one embodiment, therefore, the request to retrieve the component 175 is not sent from the browser 161 to the web server module 110 if the product page 173 is contained within a frame in the affiliate page 176.

Figure 4:
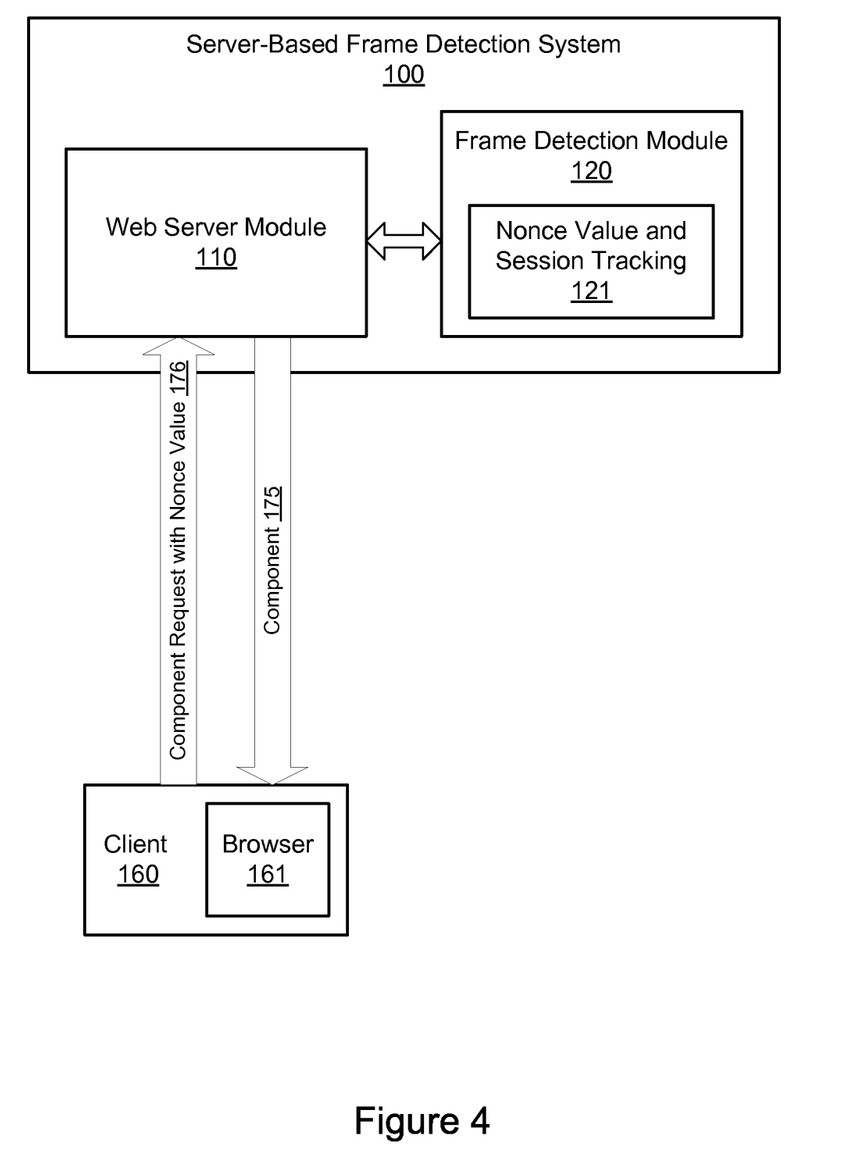
FIG. 4 illustrates further aspects of an example system environment for detection of child frames in web pages according to one embodiment.

FIG. 4 illustrates further aspects of an example system environment for detection of child frames in web pages according to one embodiment. In one embodiment, the component 175 within the child iframe 174 that is provided as part of the product page 173 may be linked to the merchant through a nonced URL. As used herein, a nonced URL refers to a uniform resource locator (URL) that contains a nonce value. As used herein, a nonce value is a value that may be used for security or authentication purposes. The nonce value may comprise a sequence of alphanumeric values (e.g., generated pseudo-randomly) and may uniquely identify a particular web transaction when added to a URL.

In one embodiment, a browser 161 that requests a web page from the web server module 110 may be assigned a session identifier. The session identifier may be stored by the merchant, e.g., using nonce value and session tracking functionality 121. The nonce value that is generated for a particular product page 173 for a particular user session may be stored by the merchant, e.g., using nonce value and session tracking functionality 121. If the browser 161 seeks to retrieve the component 175 using the nonced URL, the browser 161 may send a component request 176 with the nonce value as part of the URL for the component 175. The merchant may store data indicating the receipt of the nonce value (i.e., as part of the nonced URL), e.g., using nonce value and session tracking functionality 121.

In one embodiment, the detection of the use of framing and/or the receipt of the nonce value may be added to a set of usage metrics such as clickstream data. The clickstream data for a session may comprise the session identifier, any generated nonce values associated with the session identifier, and any received nonce values associated with the session identifier. If the clickstream data does not indicate that a matching nonce value (i.e., matching the relevant generated nonce value) was received, then a referral for the resulting transaction may be deemed illegitimate or fraudulent. The clickstream data may then be used to deny a payment to an affiliate if a referral from the affiliate is determined to be fraudulent (e.g., through the practice of cookie stuffing). Similarly, the clickstream data may be used to prevent the addition of a product page to a user's product browsing history if the visit to the product page is determined to be illegitimate (e.g., through the practice of history stuffing).

If a transaction associated with the product page is completed, the merchant may assess whether any compensation is due for an affiliate referral for the transaction. The affiliate referral may be considered legitimate if the nonce value associated with the user session was received by the merchant (i.e., as part of the nonced URL). Conversely, the referral may be considered illegitimate if the nonce value generated for the product page was not received by the merchant. Referral fees may be paid only if the referral is determined to be legitimate.

Figure 5:
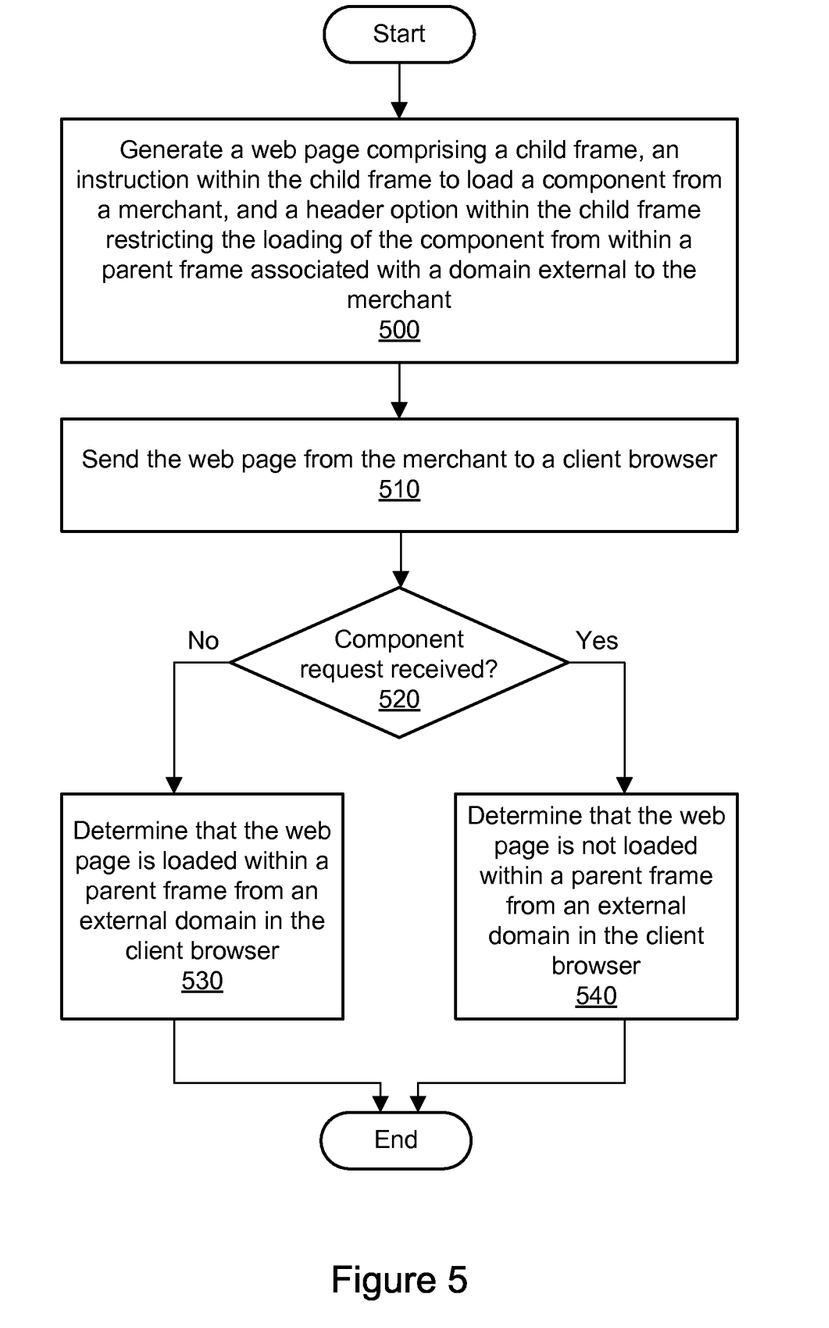
FIG. 5 is a flowchart illustrating a method for detection of child frames in web pages, according to one embodiment.

FIG. 5 is a flowchart illustrating a method for detection of child frames in web pages, according to one embodiment. A web page such as a product page may be requested from an online merchant by a client browser. As shown in 500, a web page comprising a child frame may be generated (e.g., by the online merchant). Generating the web page may comprise retrieving one or more static elements and/or dynamically generating one or more elements of the web page. The child frame in the generated web page may comprise an instruction or link (e.g., a URL) to load a component from a merchant. In one embodiment, the instruction or link to load the component comprises a nonced URL, and the nonced URL comprises a nonce value. The child frame may comprise a header option restricting a loading of the component from within a parent frame associated with a domain external to the merchant. For example, the header option may comprise a "same-origin" option for an X-Frame-Options header. As shown in 510, the generated web page may be sent from the merchant to a client browser.

As shown in 520, a determination may be made as to whether a request for the component was received by the merchant. As discussed above, the component request may be received only if the child frame in the generated web page is not rendered within a frame in the affiliate page 176 (i.e., a web page hosted at a domain external to the merchant's domain). As shown in 530, if the component request is not received, a determination may be made that the web page is loaded within a parent frame (e.g., an affiliate page) in the client browser. As shown in 540, if the component request is received, a determination may be made that the web page is not loaded within a parent frame (e.g., an affiliate page) in the client browser.

In one embodiment, the framing detection may be used to detect and mitigate the practice of cookie stuffing. If framing is detected in the rendering of the product page in the client browser, a referral fee for the transaction may be denied on the basis that cookie stuffing is likely to have taken place. However, if framing is not detected, then a referral fee for the transaction may be approved. In one embodiment, the framing detection may be used to detect and mitigate the practice of history stuffing. If framing is detected in the rendering of the product page in the client browser, then the product page may be removed from a product browsing history for a user of the client browser.

In one embodiment, the framing detection may be used to detect and defend against the practice of clickjacking Clickjacking may also be referred to as a user interface redress attack. In a typical instance of clickjacking, user input (e.g., a button selection, keystrokes, etc.) is hijacked through the use of multiple layers to disguise the identity of the user interface element being used to capture the user input. As a result of the clickjacking, any number of undesirable actions or transactions may be performed without the user's knowledge or consent. Using the systems and methods described herein, the use of clickjacking may be detected. The clickjacking may be associated with one or more actions or transactions (e.g., through a session identifier associated with the browser). After the clickjacking has been detected, the associated action(s) or transaction(s) may be rejected by the online merchant or any other online entity. In this manner, the user and/or merchant may be protected from the effects of clickjacking fraud.

Illustrative Computer System

Figure 6:
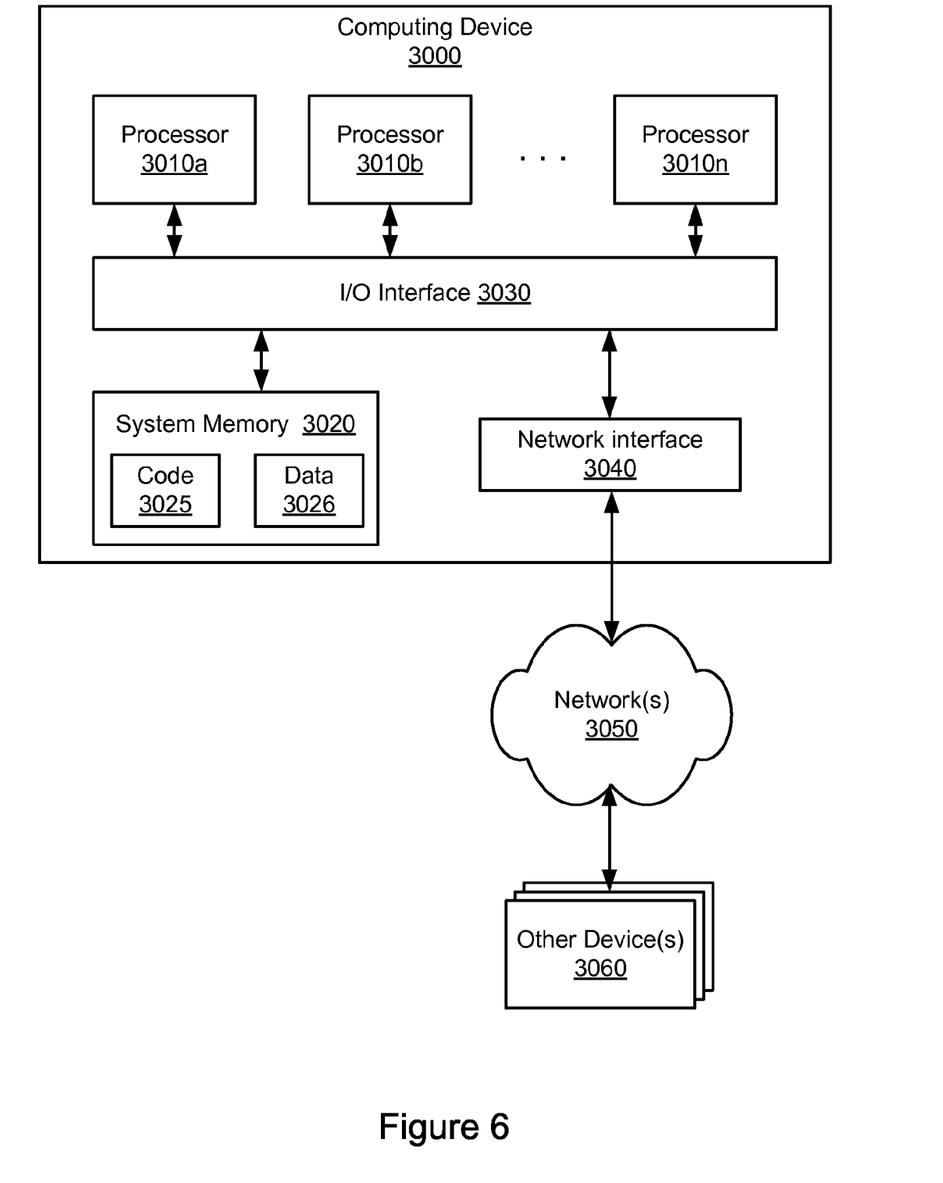
FIG. 6 illustrates an example computing device that may be used in some embodiments.

In at least some embodiments, a computer system that implements a portion or all of one or more of the technologies described herein, such as the server-based frame detection system 100, may include a general-purpose computer system that includes or is configured to access one or more computer-readable media. FIG. 6 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1, 2, and 4, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for FIGS. 1 through 5 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 6 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

CONCLUSION

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computers configured to implement a server-based frame detection system, wherein the frame detection system comprises:
a web server module configured to:
generate a product page comprising a child iframe, wherein the child iframe comprises a uniform resource locator (URL) for a component from a merchant, wherein the URL comprises a nonce value, and wherein the child iframe comprises a header option preventing issuance of a request for the component from within an external parent frame associated with a domain external to the merchant; and
send the product page from the merchant to a client browser;
complete a transaction between the merchant and the client browser for a sale of an item offered on the product page; and
a frame detection module configured to:
detect that the product page is loaded within the external parent frame in the client browser if the request for the component and the nonce value are not received by the merchant; and
detect that the product page is not loaded within the external parent frame in the client browser if the request for the component and the nonce value are received by the merchant.

2. The system as recited in claim 1, wherein the frame detection module is further configured to:
determine that an action, a transaction, or a referral from an affiliate of the merchant is illegitimate if the nonce value is not received by the merchant from the client browser; and
determine that the action, the transaction, or the referral from the affiliate of the merchant is legitimate if the nonce value is received by the merchant from the client browser.

3. The system as recited in claim 1, wherein the external parent frame is provided to the client browser by an affiliate of the merchant, and wherein the frame detection module is further configured to:
deny a referral fee for the transaction to the affiliate if the product page is loaded within the external parent frame in the client browser; and
approve a referral fee for the transaction to the affiliate if the product page is not loaded within the external parent frame in the client browser.

4. The system as recited in claim 1, wherein the header option comprises a sameorigin option for an X-Frame-Options header.

5. A computer-implemented method, comprising:
performing, by a computer:
generating a web page comprising a child frame, wherein the child frame comprises an instruction to load a component from a merchant, and wherein the child frame comprises a header option preventing issuance of a request for the component from within an external parent frame associated with a domain external to the merchant;
sending the web page from the merchant to a client browser;
determining that the web page is loaded within the external parent frame in the client browser if the request for the component is not received by the merchant; and
determining that the web page is not loaded within the external parent frame in the client browser if the request for the component is received by the merchant.

6. The method as recited in claim 5, wherein the instruction to load the component comprises a nonced uniform resource locator (URL), wherein the nonced URL comprises a nonce value.

7. The method as recited in claim 6, wherein the external parent frame is provided to the client browser by an affiliate of the merchant, and wherein the method further comprises:
determining that a referral from the affiliate of the merchant is illegitimate if the nonce value is not received by the merchant from the client browser; and
determining that a referral from the affiliate of the merchant is legitimate if the nonce value is received by the merchant from the client browser.

8. The method as recited in claim 6, further comprising:
determining that an action or transaction is illegitimate if the nonce value is not received by the merchant from the client browser; and
rejecting the action or transaction.

9. The method as recited in claim 5, wherein the external parent frame is provided to the client browser by an affiliate of the merchant, and wherein the method further comprises:
  completing a transaction between the merchant and the client browser for a product or service offered on the web page;
  denying a referral fee for the transaction to the affiliate if the web page is loaded within the external parent frame in the client browser; and
  approving a referral fee for the transaction to the affiliate if the web page is not loaded within the external parent frame in the client browser.

10. The method as recited in claim 5, further comprising:
  removing the web page from a product browsing history for a user of the client browser if the web page is loaded within the external parent frame in the client browser.

11. The method as recited in claim 5, wherein the header option comprises a sameorigin option for an X-Frame-Options header.

12. A non-transitory, computer-readable storage medium storing program instructions computer-executable to perform:
  generating a web page comprising an inline frame, wherein the inline frame comprises a link to load a component from a merchant, and wherein the inline frame comprises a restriction on issuance of a request for the component from within an external parent frame associated with a domain external to the merchant;
  sending the web page from the merchant to a client browser;
  determining that the web page is loaded within the external parent frame in the client browser if the request for the component is not received by the merchant; and
  determining that the web page is not loaded within the external parent frame in the client browser if the request for the component is received by the merchant.

13. The non-transitory, computer-readable storage medium as recited in claim 12, wherein the link to load the component comprises a nonced uniform resource locator (URL), wherein the nonced URL comprises a nonce value.

14. The non-transitory, computer-readable storage medium as recited in claim 13, wherein the program instructions are further computer-executable to perform:
  determining that a referral from an affiliate of the merchant is illegitimate if the nonce value is not received by the merchant from the client browser; and
  determining that a referral from an affiliate of the merchant is legitimate if the nonce value is received by the merchant from the client browser.

15. The non-transitory, computer-readable storage medium as recited in claim 13, wherein the program instructions are further computer-executable to perform:
  determining that an action or transaction is illegitimate if the nonce value is not received by the merchant from the client browser; and
  rejecting the action or transaction.

16. The non-transitory, computer-readable storage medium as recited in claim 12, wherein the external parent frame is sent to the client browser by an affiliate of the merchant, and wherein the program instructions are further computer-executable to perform:
  completing a transaction between the merchant and a user of the client browser for a product or service offered on the web page;
  denying a referral fee for the transaction to the affiliate if the web page is loaded within the external parent frame in the client browser; and
  approving a referral fee for the transaction to the affiliate if the web page is not loaded within the external parent frame in the client browser.

17. The non-transitory, computer-readable storage medium as recited in claim 12, wherein the program instructions are further computer-executable to perform:
  removing the web page from a product browsing history for a user of the client browser if the web page is loaded within the external parent frame in the client browser.

18. The non-transitory, computer-readable storage medium as recited in claim 12, wherein the restriction comprises a sameorigin option for an X-Frame-Options header.

19. A system, comprising:
  at least one processor; and
  a memory coupled to the at least one processor, wherein the memory stores program instructions, wherein the program instructions are executable by the at least one processor to:
    generate a web page comprising an iframe, wherein the iframe comprises an instruction to load a component from a merchant, and wherein the iframe comprises a header option preventing issuance of a request for the component from within an external parent frame associated with a domain external to the merchant;
    send the web page from the merchant to a browser;
    determine that the web page is loaded within the external parent frame in the browser if the request for the component is not received by the merchant; and
    determine that the web page is not loaded within the external parent frame in the browser if the request for the component is received by the merchant.

20. The system as recited in claim 19, wherein the instruction to load the component comprises a nonced uniform resource locator (URL), wherein the nonced URL comprises a nonce value.

21. The system as recited in claim 20, wherein the program instructions are further executable by the at least one processor to:
  determine that a referral from an affiliate of the merchant is illegitimate if the nonce value is not received by the merchant from the browser; and
  determine that a referral from an affiliate of the merchant is legitimate if the nonce value is received by the merchant from the browser.

22. The system as recited in claim 20, wherein the program instructions are further executable by the at least one processor to:
  determine that an action or transaction is illegitimate if the nonce value is not received by the merchant from the browser; and
  reject the action or transaction.

23. The system as recited in claim 19, wherein the external parent frame is provided to the browser by an affiliate of the merchant, and wherein the program instructions are further executable by the at least one processor to:
  complete a transaction between the merchant and the browser for a product or service offered on the web page;
  deny a referral fee for the transaction to the affiliate if the web page is loaded within the external parent frame in the browser; and
  approve a referral fee for the transaction to the affiliate if the web page is not loaded within the external parent frame in the browser.

24. The system as recited in claim 19, wherein the program instructions are further executable by the at least one processor to:

remove the web page from a product browsing history for a user of the browser if the web page is loaded within the external parent frame in the browser.

25. The system as recited in claim 19, wherein the header option comprises a sameorigin option for an X-Frame-Options header.

* * * * *